United States Patent
Prince et al.

(10) Patent No.: US 11,167,228 B2
(45) Date of Patent: Nov. 9, 2021

(54) POINT OF ENTRY WATER FILTER ASSEMBLY

(71) Applicant: Haier US Appliance Solutions, Inc., Wilmington, DE (US)

(72) Inventors: Ryan John Prince, Louisville, KY (US); Alan Joseph Mitchell, Louisville, KY (US); Gregory Sergeevich Chernov, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 175 days.

(21) Appl. No.: 15/862,690

(22) Filed: Jan. 5, 2018

(65) Prior Publication Data
US 2019/0209952 A1 Jul. 11, 2019

(51) Int. Cl.
*B01D 35/30* (2006.01)
*B01D 29/11* (2006.01)
*B01D 35/14* (2006.01)
*C02F 1/00* (2006.01)

(52) U.S. Cl.
CPC .......... *B01D 35/306* (2013.01); *B01D 29/114* (2013.01); *B01D 35/14* (2013.01); *C02F 1/00* (2013.01); *B01D 2201/291* (2013.01); *B01D 2201/295* (2013.01); *B01D 2201/302* (2013.01); *B01D 2201/4023* (2013.01); *C02F 2201/006* (2013.01); *C02F 2307/12* (2013.01)

(58) Field of Classification Search
CPC .... B01D 35/306; B01D 29/114; B01D 35/14; B01D 2201/4023; B01D 2201/295; B01D 2201/291; B01D 2201/302; C02F 1/00; C02F 2307/12; C02F 2201/006; C02F 2201/004
See application file for complete search history.

(56) References Cited

U.S. PATENT DOCUMENTS

| | | | | |
|---|---|---|---|---|
| 4,713,175 A * | 12/1987 | Bray | ...................... | B01D 61/08 210/259 |
| 5,753,107 A * | 5/1998 | Magnusson | .......... | B01D 35/153 210/109 |
| 5,826,854 A * | 10/1998 | Janvrin | .................. | B01D 27/08 251/149.9 |
| 6,436,282 B1 * | 8/2002 | Gundrum | ............... | B01D 61/08 210/117 |
| 7,763,170 B2 * | 7/2010 | Bassett | .................. | B01D 27/08 210/232 |
| 8,216,463 B1 | 7/2012 | Baird | | |
| 9,067,154 B1 | 6/2015 | Branscomb et al. | | |
| 9,469,551 B2 | 10/2016 | Sherman et al. | | |
| 2013/0193054 A1 * | 8/2013 | Beard | .................... | B01D 29/21 210/232 |
| 2015/0157967 A1 | 6/2015 | Krause et al. | | |

* cited by examiner

*Primary Examiner* — Waqaas Ali
(74) *Attorney, Agent, or Firm* — Dority & Manning, P.A.

(57) ABSTRACT

A filter assembly that includes one or more features that enhance installation, inspection, and replacement of the filter is provided. In one exemplary aspect, the filter assembly includes a manifold and a filter media assembly that includes a filter media and an end cap attached thereto. The end cap and manifold include features that provide for secure mounting of the filter media assembly with the manifold so as to facilitate inspection, installation, and removal of the filter assembly.

19 Claims, 14 Drawing Sheets

POINT OF ENTRY WATER FILTER ASSEMBLY

FIELD OF THE INVENTION

The present subject matter relates generally to water filter assemblies and more particularly to point of entry water filter assemblies.

BACKGROUND OF THE INVENTION

Conventional filter assemblies for liquid filtration include a filter contained within a filter housing or sump that is secured to a manifold. The filter sump can be removed from the manifold in order to replace the filter. The user may decide to replace the filter at timed intervals or when an inspection determines the filter is spent. Several factors can make such inspection and replacement of the filter challenging.

For water filtration, e.g., potable water filtration, the filter assembly may be located at the point of entry into residential or commercial structure so as to provide filtration of all water being used therein. The filter assembly may also be installed at the point of use such as under a lavatory or in combination with a water dispenser such as a water fountain or in a refrigerator. Depending upon the location of the installation, access to the filter assembly for replacement of the filter may be limited. Locations in the crawl space of a residence, for example, may be particularly difficult to service due to the limited space available.

Typically, conventional filter assemblies include coarse threads for complementary connection between the filter sump and the manifold. Installation includes placing the filter media into the sump, aligning the filter media with the manifold, aligning the threads of the filter sump with the manifold, and then rotating the filter sump to create a face seal. That is, as the filter sump is threaded into engagement with the manifold, an O-ring positioned on the filter sump near the threads and around the opening provides for a compression face seal. The threads can be difficult to properly align so as to avoid cross-threading when installing the filter sump. Maintaining the proper positioning of the O-ring during installation can also be challenging because rotation of the filter sump against the manifold may undesirably displace the O-ring. In addition, if the filter media is not properly aligned with the manifold or if the filter media is displaced out of alignment during attachment of the filter sump to the manifold, a bad seal and/or bypass and contamination of the filtered water may result. Further, once installed, if the filter is not regularly replaced, the threads may lock and the O-ring may stick. This may significantly increase the force required for disassembly. For some applications, the filter and filter housing may be relatively large and heavy, which can increase the difficulty of properly aligning the threads and holding these parts in place during installation.

During removal, once the threads are disengaged, the filter sump and filter media may be filled with liquid. Typically, when the filter sump is disengaged from the manifold, the face seal between the filter media and the manifold likewise disengages. Thus, the filter media remains in the sump during removal, which increases the weight of the assembly and increases the chance of water spillage. Indeed, in many cases, the filter sump is completely filled with water when it is removed, making water spillage virtually unavoidable.

Further, to tighten or loosen the filter sump, a separate tool such as a specially adapted wrench is often required. Many times a separate tool is required so that enough force can be generated to properly compress and seal the O-ring of the filter sump with the manifold. In addition, conventional tools such as wrenches and pliers may not be large enough to grasp the filter housing, so misplacing the separate tool may create problems.

These and other challenges can make filter inspection, installation, and replacement very difficult. Accordingly, a filter assembly with features that facilitate one or more of aspects of filter installation, inspection, and replacement would be useful.

BRIEF DESCRIPTION OF THE INVENTION

The present disclosure provides a filter assembly that includes one or more features that enhance installation, inspection, and replacement of the filter. The filter assembly includes a manifold and a filter media assembly that includes a filter media and an end cap attached thereto. The end cap and manifold include features that provide for secure mounting of the filter media assembly with the manifold so as to facilitate inspection, installation, and removal of the filter assembly. Additional aspects and advantages of the invention will be set forth in part in the following description, or may be apparent from the description, or may be learned through practice of the invention.

In one exemplary embodiment, a filter assembly is provided. The filter assembly includes a manifold having an inlet for liquid flow into the filter assembly and an outlet for liquid flow out of the filter assembly, the manifold comprising one or more guide members each defining an undercut groove. The filter assembly also includes a sump defining an internal chamber and removably mounted with the manifold. Further, the filter assembly includes a filter media assembly receivable within the internal chamber of the sump and comprising a filter media and an end cap attached thereto, the end cap comprising one or more lugs that are removably insertable into a respective one of the undercut grooves of one of the guide members.

In another exemplary embodiment, a filter assembly defining an axial direction, a radial direction, and a circumferential direction is provided. The filter assembly includes a manifold having an inlet for liquid flow into the filter assembly and an outlet for liquid flow out of the filter assembly. The manifold includes a recessed wall disposed within a cavity defined by the manifold and one or more guide members projecting from the recessed wall along the axial direction and extending along the circumferential direction, each of the one or more guide members defining an undercut groove. The filter assembly also includes a sump defining an internal chamber and removably mounted with the manifold. Further, the filter assembly includes a filter media assembly receivable within the internal chamber of the sump and comprising a filter media and an end cap attached thereto, the end cap comprising a body and one or more lugs projecting outward from the body along the radial direction and extending along the circumferential direction, wherein the one or more lugs are removably insertable into a respective one of the undercut grooves of one of the guide members such that the filter media assembly is removably mounted with the manifold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
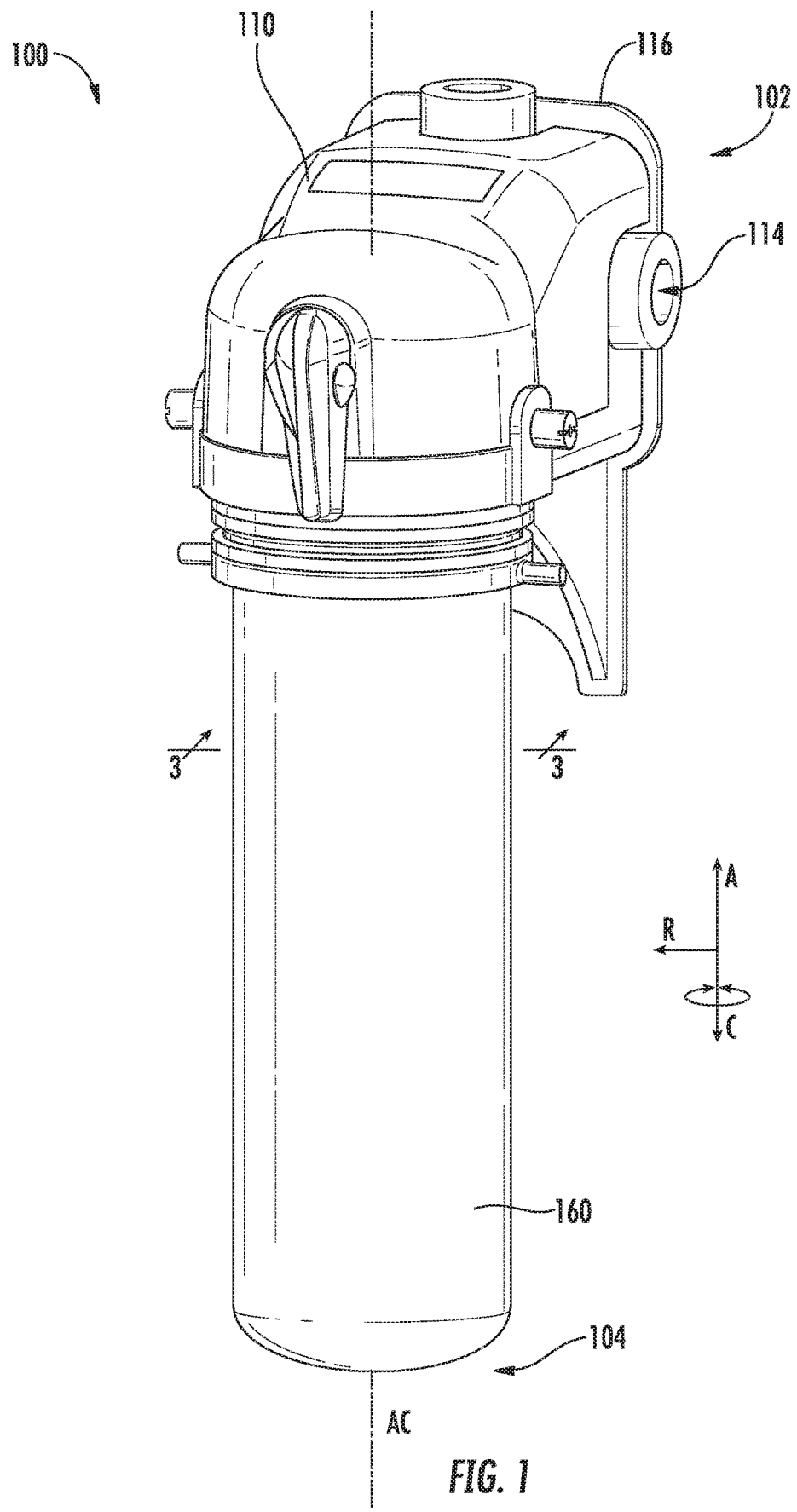
FIG. 1 provides a perspective view of an exemplary filter assembly according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. Furthermore, as used herein, terms of approximation, such as "approximately," "substantially," or "about," refer to being within a ten percent margin of error.

Figure 2:
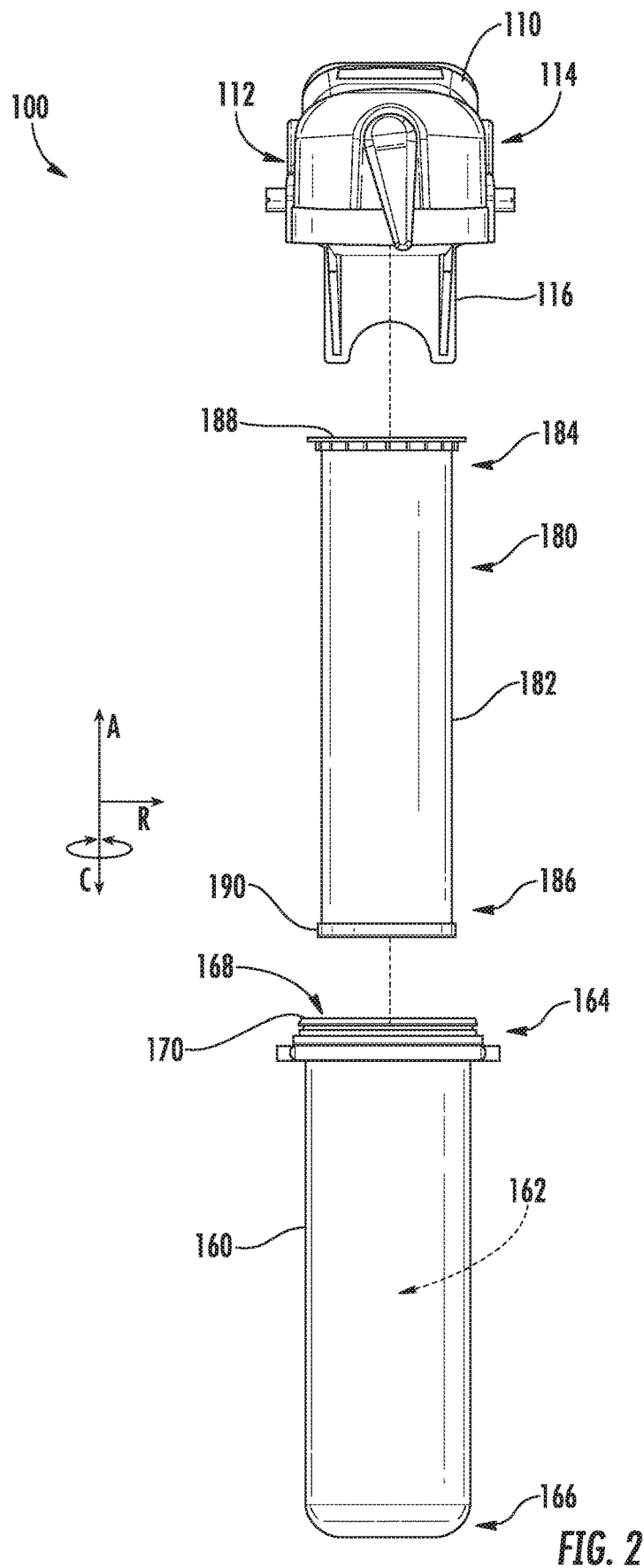
FIG. 2 provides an exploded view of the filter assembly of FIG. 1.
Figure 3:
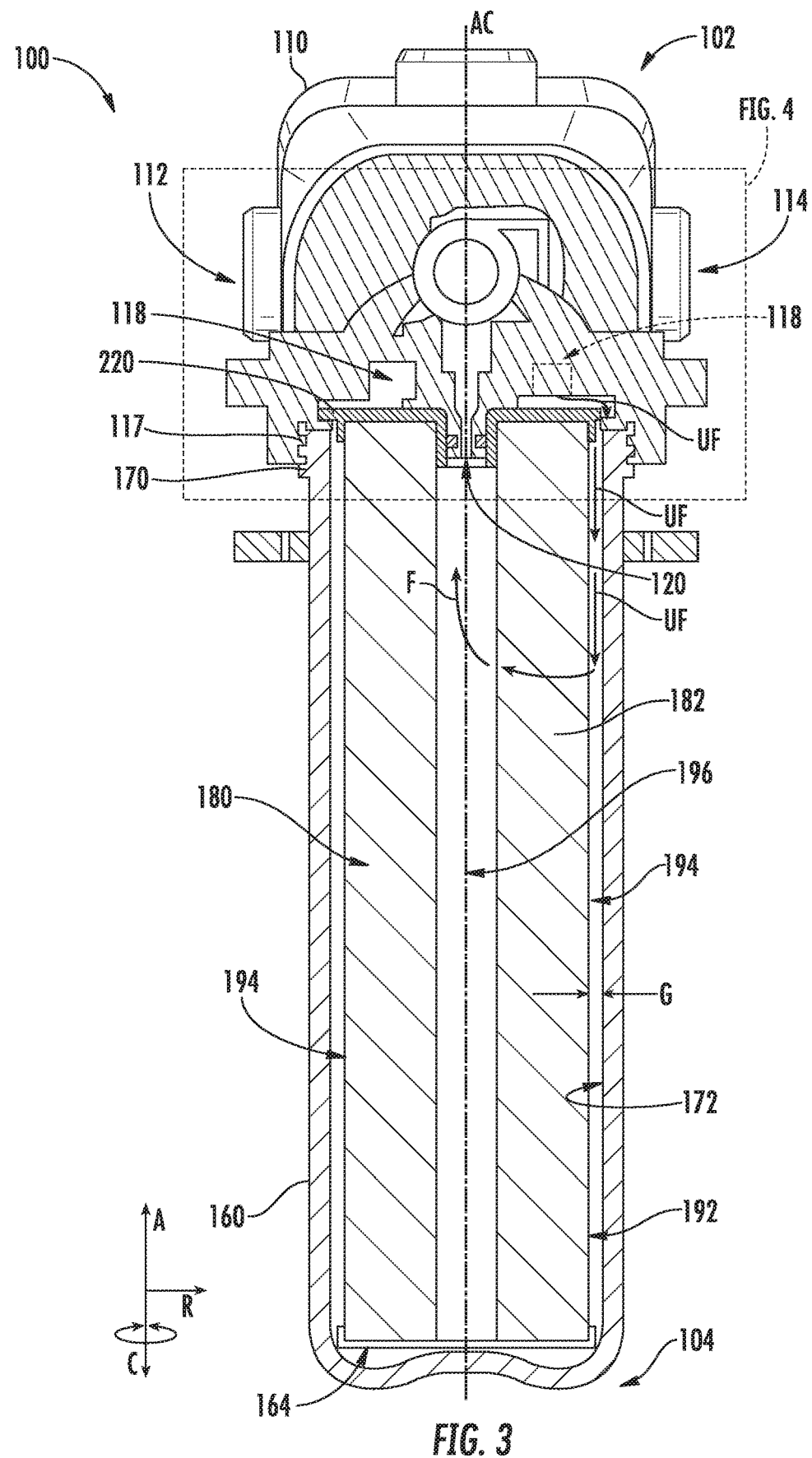
FIG. 3 provides a front, cross sectional view of the filter assembly of FIG. 1.
Figure 4:
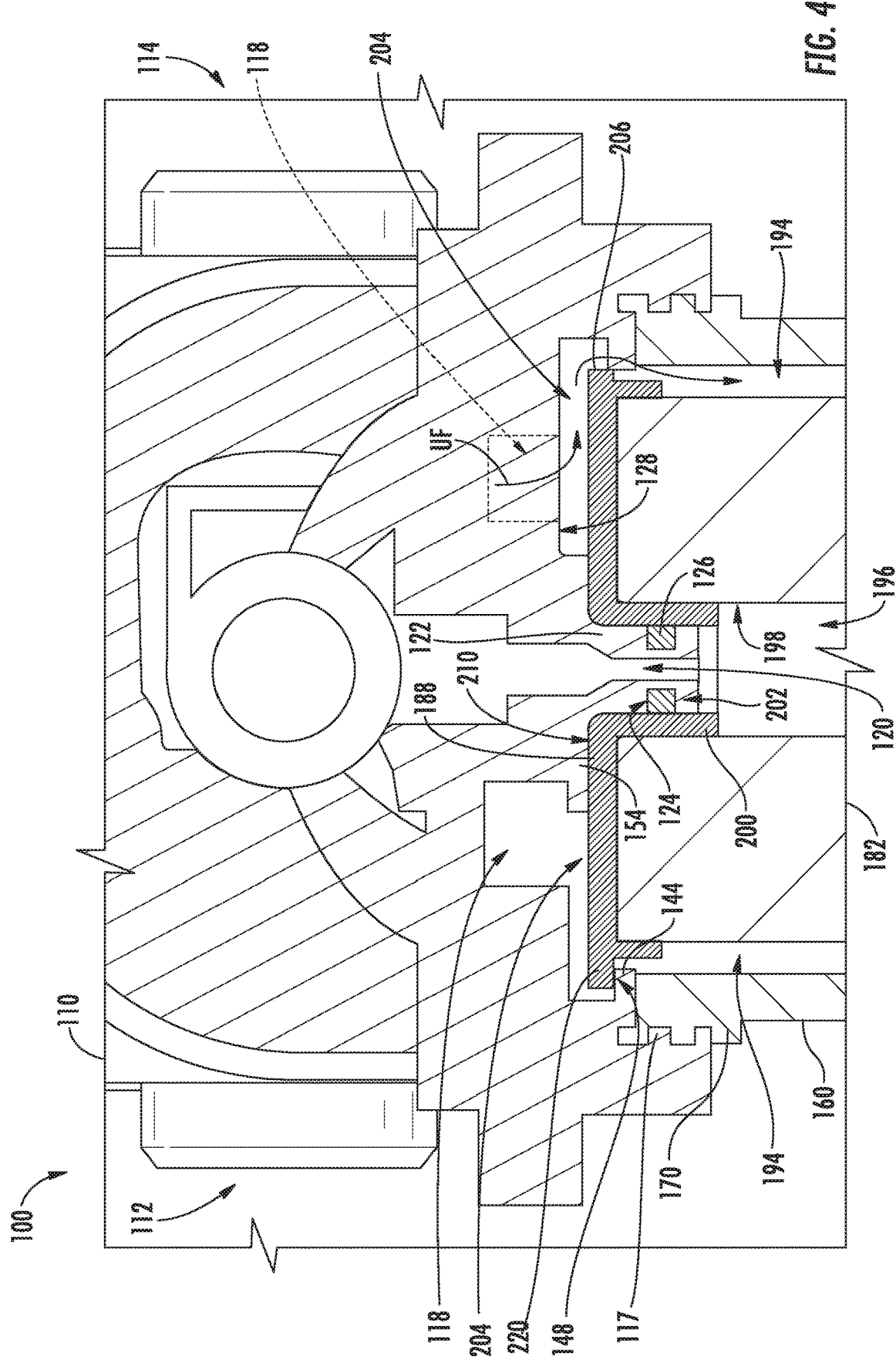
FIG. 4 provides a close up view of section 4 of FIG. 3.

FIGS. 1, 2, 3, and 4 provide views of an exemplary filter assembly 100 according to an exemplary embodiment of the present disclosure. In particular, FIG. 1 provides a perspective view of filter assembly 100, FIG. 2 provides an exploded view thereof, FIG. 3 provides a front, cross sectional view thereof taken along line 3-3 of FIG. 1, and FIG. 4 provides a view of Section 4 of FIG. 3, which is a close up view of filter assembly 100. Filter assembly 100 may be used e.g., with potable water, fuels, or other liquid filtration applications. Removal of undesired components (e.g., sediment, chemicals, microorganisms) from the liquid may be accomplished by combinations of mechanical filtration, adsorption, or other processes. The various embodiments of the present disclosure will be described with reference to the filtration of potable water. However, the exemplary embodiments described and illustrated herein may be used for filtering other liquids as well. For potable water, filter assembly 100 may be installed near the point of entry of the water supply into a home or a commercial structure. Thus, in some embodiments, filter assembly 100 is a point of entry filter assembly. Alternatively, filter assembly 100 may be installed under a kitchen sink or in a bathroom lavatory. Other installations may be used as well. Thus, in some embodiments, filter assembly 100 is a point of use filter assembly.

Filter assembly 100 defines an axial direction A, a radial direction R extending outward from the axial direction A, and a circumferential direction C extending about axial direction A (e.g., three hundred sixty degrees 360°) about the axial direction A). In addition, an axial centerline AC is defined by filter assembly 100 as shown in FIG. 1. As used herein, "radially inward" is a direction toward the axial centerline AC and "radially outward" is a direction opposite or away from the axial centerline AC.

As depicted, filter assembly 100 extends between a top 102 and a bottom 104 along the axial direction A (FIGS. 1 and 3). Generally, filter assembly 100 includes a manifold 110 positioned at or proximate top 102 of filter assembly 100, a sump 160 removably mounted to manifold 110, and a filter media assembly 180 (FIG. 2) removably mounted to manifold 110 for filtering fluid. As shown particularly in FIG. 3, when filter assembly 100 is assembled, filter media assembly 180 is disposed or received within an internal chamber 162 defined by sump 160.

Manifold 110 has an inlet 112 (FIGS. 2 and 3) for receiving a fluid flow into filter assembly 100. Inlet 112 may be in fluid communication with a water supply and may receive unfiltered water from the water supply. Internal features of manifold 110, filter media assembly 180, and sump 160 direct or route the unfiltered water into a filter media 182 of filter media assembly 180 for filtering the water (FIGS. 2 and 3). The filtered water then travels out of filter assembly 100 through an outlet 114 of manifold 110. The filtered water may then be distributed within a structure for various points of use, e.g., to a sink, to a refrigerator appliance, etc. Further, manifold 110 includes a mounting bracket 116 (FIG. 1) that provides a structural component for mounting of filter assembly 100 to a suitable structure. Other configurations for mounting or hanging filter assembly 100 may be used as well.

As depicted in FIG. 2, sump 160 extends between a top portion 164 and a bottom portion 166, e.g., along the axial direction A. Sump 160 also defines an opening 168 at its top portion 164. Opening 168 permits access to internal chamber 162 of sump 160. As noted above, sump 160 is removably mounted to manifold 110. For instance, for this exemplary embodiment, sump 160 includes threads 170 that are complementary to threads 117 of manifold 110 such that sump 160 is removably mounted to manifold 110 by a threaded engagement between threads 170 of sump 160 and threads 117 of manifold 110 as shown in FIG. 3. In this way, sump 160 may be removed to access filter media assembly 180, e.g., to inspect or replace filter media assembly 180. Sump 160 may be removably mounted to manifold 110 in other suitable manners as well. Sump 160 may be formed of any suitable material and in any suitable manner. For example, sump 160 may be molded from a suitable plastic material, or alternatively, sump 160 may be cast from aluminum or stainless steel.

Referring particularly to FIG. 2, filter media assembly 180 extends between a top portion 184 and a bottom portion 186 along the axial direction A as shown. Filter media 182 is disposed between a top end cap 188 attached to filter media 182 at top portion 184 and a bottom end cap 190 attached to filter media 182 at bottom portion 186. Filter media 182 may be constructed from a variety of materials. For instance, filter media 182 may be an activated carbon block, pleated sheets, melt-blown polypropylene, string wound filters, paper, various textiles, adsorption media, a combination thereof, or other suitable materials depending upon the filtration desired. For this embodiment, filter media 182 is an activated carbon block. Top end cap 188 and bottom end cap 190 may be attached to filter media 182 in any suitable manner, such as e.g., by a suitable adhesive. Top end cap 188 serves as the mounting interface between filter media assembly 180 and manifold 110. Bottom end cap 190 serves as a seal and prevents fluid from bypassing filter media 182.

As depicted in FIGS. 3 and 4, manifold 110 defines one or more inlet passages 118 (one inlet passage 118 is shown in phantom in FIGS. 3 and 4) and an outlet passage 120. For this embodiment, outlet passage 120 is a single outlet passage (i.e., the only outlet through which fluid may flow out of filter media assembly 180 and sump 160). Inlet passages 118 are in fluid communication with inlet 112 of manifold 110 and with internal chamber 162 of sump 160. Thus, unfiltered water can enter manifold 110 through inlet 112 and then flow downstream to internal chamber 162 of sump 160 through inlet passages 118 of manifold 110. Outlet passage 120 defined by manifold 110 is in fluid communication with outlet 114 of manifold 110 and internal chamber 162 of sump 160. Thus, filtered water can exit internal chamber 162 of sump 160 through outlet passage 120 of manifold 110 and may flow downstream to outlet 114 of manifold 110.

As shown in FIG. 3, filter media assembly 180 is disposed or received within internal chamber 162 when filter assembly 100 is assembled. Filter media 182 of filter media assembly 180 is spaced apart from an inner surface 172 of sump 160, e.g., along the radial direction R. As will be explained in greater detail below, filter media assembly 180 is removably mounted directly to manifold 110. The mounting of filter media assembly 180 to manifold 110 secures filter media assembly 180 in place in order to define a gap G between inner surface 172 of sump 160 and an outer surface 192 of filter media 182.

Filter media 182 divides internal chamber 162 into an unfiltered volume 194 and a filtered volume 196. Generally, unfiltered volume 194 extends about filter media 182 along the circumferential direction C, between top portion 164 and bottom portion 166 of sump 160 along the axial direction A, and between inner surface 172 of sump 160 and outer surface 192 of filter media 182 along the radial direction R. Outer surface 192 of filter media 182 defines a filter media inlet through which unfiltered liquid flows to filter volume 196. Filtered volume 196 is defined by filter media 182 as a generally cylindrical volume that extends along the axial direction A, and more particularly, along the axial centerline AC. Filter media 182 removes impurities and contaminants from water passing through filter media 182 from unfiltered volume 194 to filtered volume 196. As used herein, the term "unfiltered" describes a volume within internal chamber 162 that is not filtered relative to filter media 182. However, as will be understood by those skilled in the art, additional filter assemblies may filter the water prior to entering internal chamber 162 filter assembly 100. Thus, "unfiltered volume" may be filtered relative to other filters but not filter media 182.

As shown particularly in FIG. 4, to prevent incoming unfiltered water from bypassing unfiltered volume 194 (i.e., short circuiting the filter) and flowing directly into filtered volume 196, a radial seal is formed between manifold 110 and top end cap 188. In particular, top end cap 188 includes a cap outlet port 200 that extends a distance into filtered volume 196 along the axial direction A. Cap outlet port 200 is positioned along an internal surface 198 of filter media 182 as shown and is generally has a hollow cylindrical shape for this embodiment. Accordingly, cap outlet port 200 defines an opening 202 through top end cap 188. Opening 202 provides fluid communication between filtered volume 196 and outlet passage 120 defined by manifold 110. Further, manifold 110 includes a manifold outlet port 122 that extends a distance into the filtered volume 196 and into opening 202 defined by cap outlet port 200. Thus, cap outlet port 200 is sized to receive manifold outlet port 122. As further shown in FIG. 4, manifold outlet port 122 defines a circumferential groove 124 (see also FIG. 6) about its radially outer surface that is sized to receive a sealing element 126. Sealing element 126 may be an O-ring, for example. Sealing element 126 radially seals manifold outlet port 122 of manifold 110 with cap outlet port 200 of top end cap 188. In this way, unfiltered water flowing downstream through inlet passage 118 is prevented from leaking or seeping into filtered volume 196. In some exemplary embodiments, filter assembly 100 may include a dual radial seal configuration for additional sealing. In such embodiments, manifold outlet port 122 may define a first circumferential groove and a second circumferential groove axially spaced from the first circumferential groove. The first and second grooves may each be sized to receive an O-ring.

Filter assembly 100 may filter water in the following exemplary manner. With reference to FIGS. 3 and 4, unfiltered water can enter filter assembly 100 through inlet 112 of manifold 110. Such unfiltered water can then flow though inlet passages 118 of manifold 110, denoted by arrows UF, into unfiltered volume 194 of internal chamber 162. For instance, unfiltered water may flow downstream through inlet passages 118 and may flow into a distribution volume 204 disposed between and defined by top end cap 188 of filter media assembly 180 and a recessed wall 128 of manifold 110. Once in distribution volume 204, the unfiltered water flows radially outward away from axial centerline AC and flows about an outer edge 206 of top end cap 188 and into unfiltered volume 194. Such unfiltered water can pass though filter media 182, e.g., along a radially inward direction, to remove impurities and can exit filter media 182 into filtered volume 196 as filtered water, denoted by arrow F in FIG. 3. Such filtered water can then pass through outlet passage 120 of manifold 110 and may exit filter assembly 100 through outlet 114 of manifold 110.

In such a manner, unfiltered water can be filtered by filter assembly 100. However, as will be understood by those skilled in the art, the effectiveness of filter media 182 can decrease over time. For example, during the normal operation the filter media: in some cases, the filter media (1) gradually becomes clogged by insoluble contaminants removed from the water (particulate filtration); (2) becomes used up through a reaction with the contaminant being reduced (chemical filtration); and/or (3) becomes "filled up" with the contaminant being reduced (adsorption). Thus, filter media 182 may require changing after a certain time interval in order to maintain proper operation of filter assembly 100. As will be explained below, filter assembly 100 includes features that facilitate inspection, removal, and installation of filter media 182 and/or filter media assembly 180. Such features will be explained in more detail below.

Figure 5:
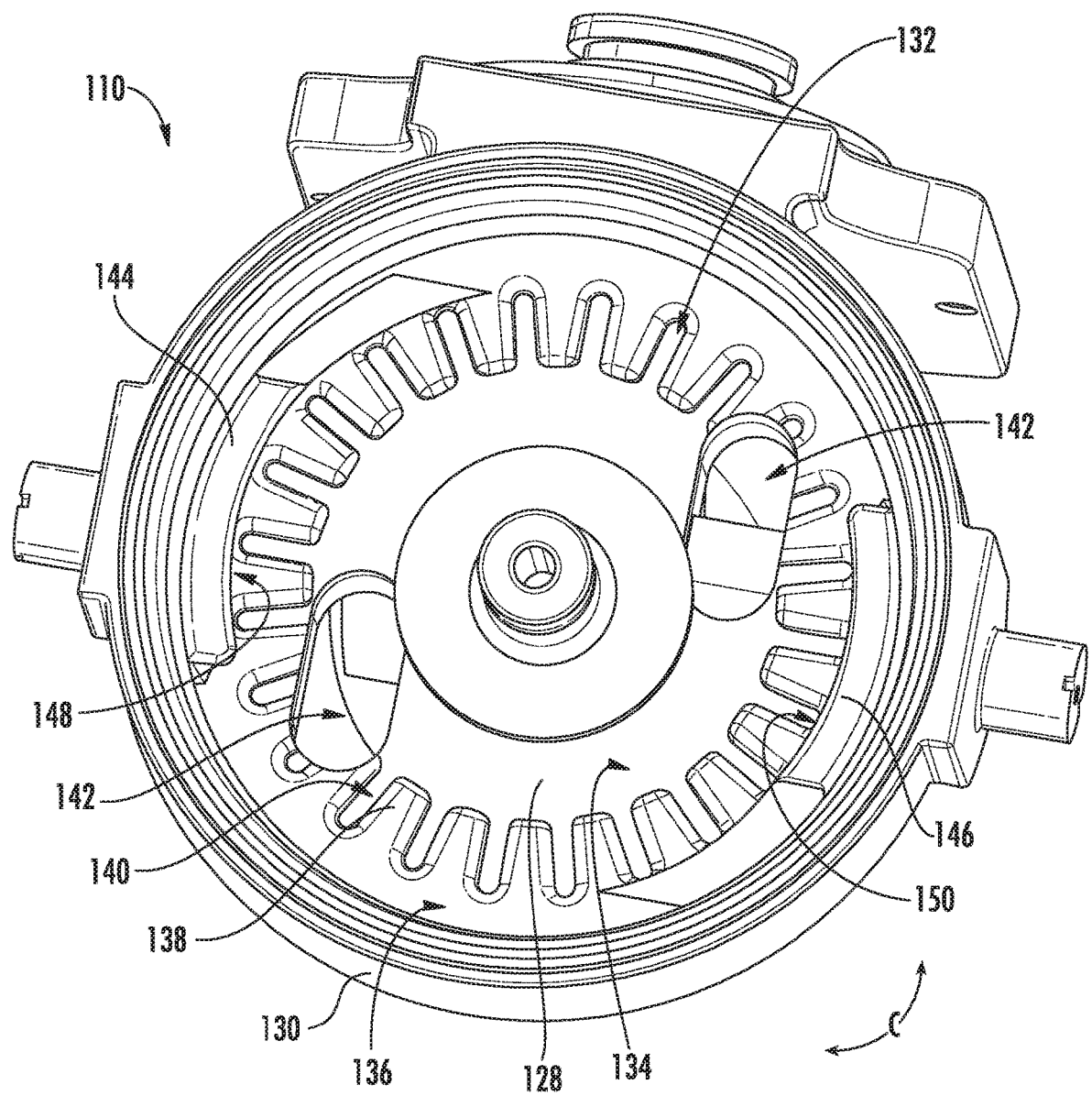
FIG. 5 provides a close-up, bottom perspective view of a manifold of the filter assembly of FIG. 1.
Figure 6:
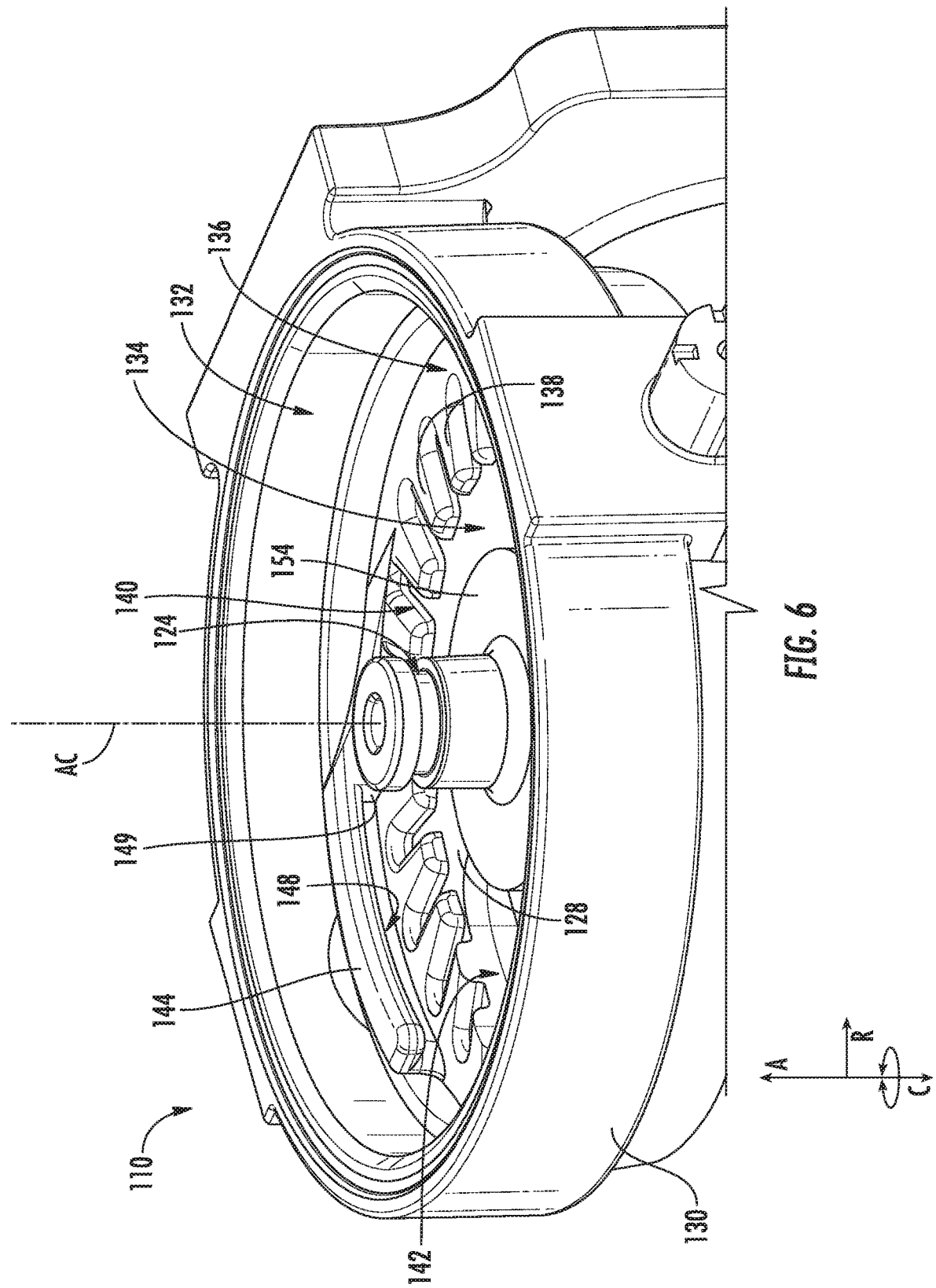
FIG. 6 provides another close-up, bottom perspective view of the manifold of the filter assembly of FIG. 1.

FIGS. 5 and 6 provide various close-up, bottom perspective views of manifold 110. As depicted, manifold 110 has a body 130 defining a cavity 132. Recessed wall 128 extends generally in a plane orthogonal to the axial direction A. Recessed wall 128 has a first portion 134 that is recessed relative to a second portion 136 of recessed wall 128. Second portion 136 of recessed wall 128 includes a plurality of radially extending projections 138 that are spaced along the circumferential direction C with channels 140 being defined between adjacent projections 138. Projections 138 facilitate the flow of water radially outward after the water exits through inlet openings 142 defined by first portion 134 of recessed wall 128. Inlet openings 142 form a part of inlet passages 118 (FIGS. 3 and 4) defined by manifold 110. As further depicted in FIGS. 5 and 6, manifold 110 includes one or more guide members. For this embodiment, a first guide member 144 and a second guide member 146 (FIG. 5) each project from recessed wall 128 along the axial direction A and each extend generally along the circumferential direction C. More particularly, first guide member 144 and second guide member 146 (FIG. 5) each project from second portion 136 of recessed wall 128 along its perimeter and extend a distance along the circumferential direction C that is approximately one fifth (⅕) of the outer perimeter of recessed wall 128. First guide member 144 and second guide member 146 are spaced from one another along the circumferential direction C as shown. First guide member 144 defines an undercut groove 148 and likewise second guide member 146 defines an undercut groove 150. Undercut grooves 148, 150 of first and second guide members 144, 146 are each sized to receive a respective lug of top end cap 188 of filter media assembly 180 (FIG. 2) as will be explained in further detail below. Moreover, for this exemplary embodiment, first guide member 144 projects from recessed wall 128 opposite second guide member 146 as shown in FIG. 5. That is, first guide member 144 projects from recessed wall 128 of manifold 110 about one hundred eighty degrees (180°) from the location where second guide member 146 projects from recessed wall 128. In this manner, as will be explained further below, during installation or removal of filter media assembly 180 to or from manifold 110, filter media assembly 180 is prevented from tipping or tilting as it is rotated about the axial direction A.

Figure 7:
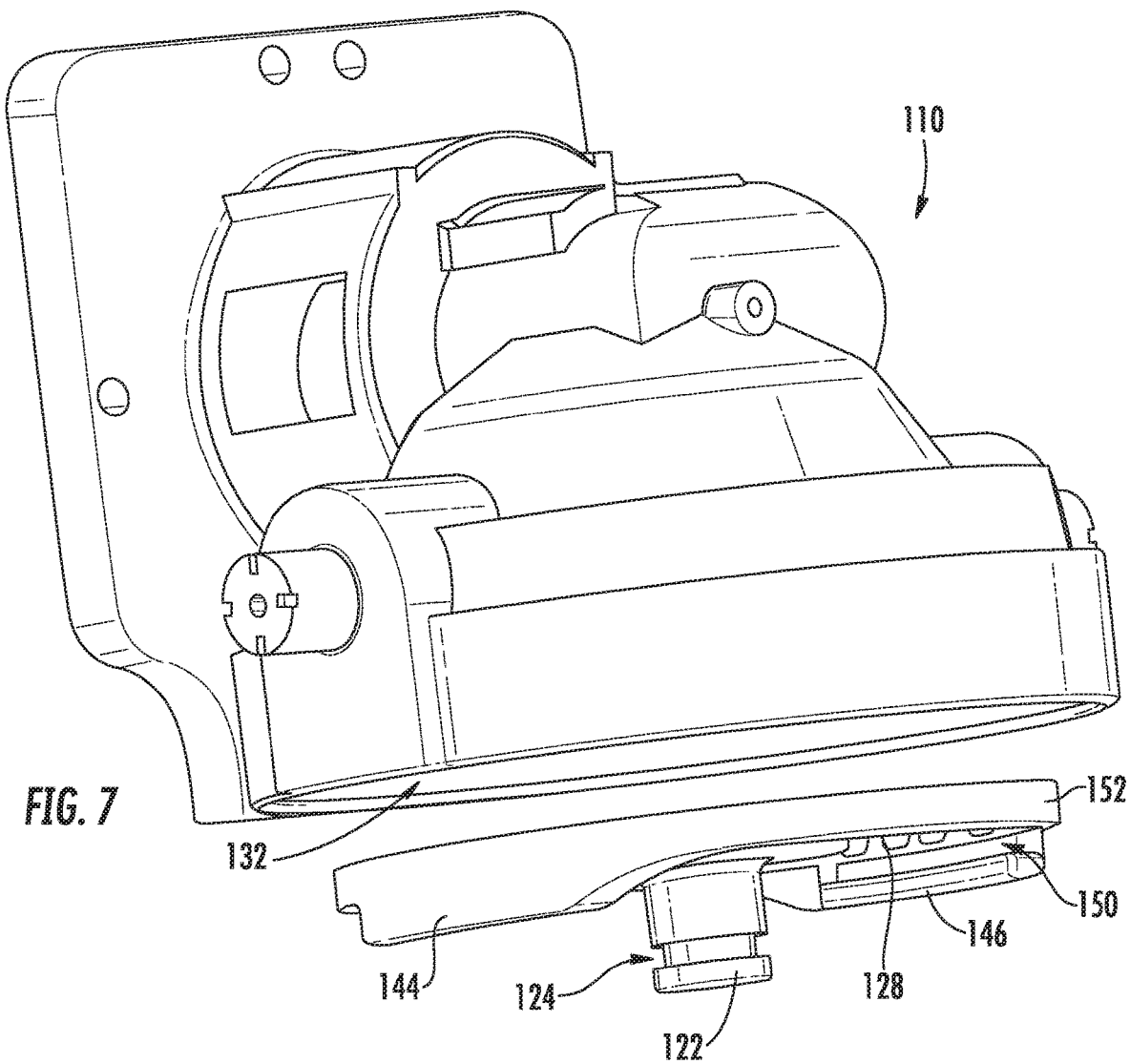
FIG. 7 provides an exploded view of a manifold having an attachment plate that forms a recessed wall of the manifold according to an exemplary embodiment of the present disclosure.

For the depicted embodiment of FIGS. 5 and 6, recessed wall 128 of manifold 110 is integrally formed with manifold 110 as a single continuous piece. This may for example, provide for reduced part count and a reduced number of parts to align, among other advantages. However, in alternative exemplary embodiments, manifold may include a separate component that forms recessed wall having first and second guides. The separate component may be seated within the cavity of manifold. As one example, FIG. 7 provides an exploded view of manifold 110 having an attachment plate 152 that forms recessed wall 128. Attachment plate 152 of manifold 110 is configured to be seated within cavity 132. By forming recessed wall 128 as part of attachment plate 152, this may provide for ease of manufacturing of the guides and/or projections of recessed wall 128, among other advantages.

Figure 8:
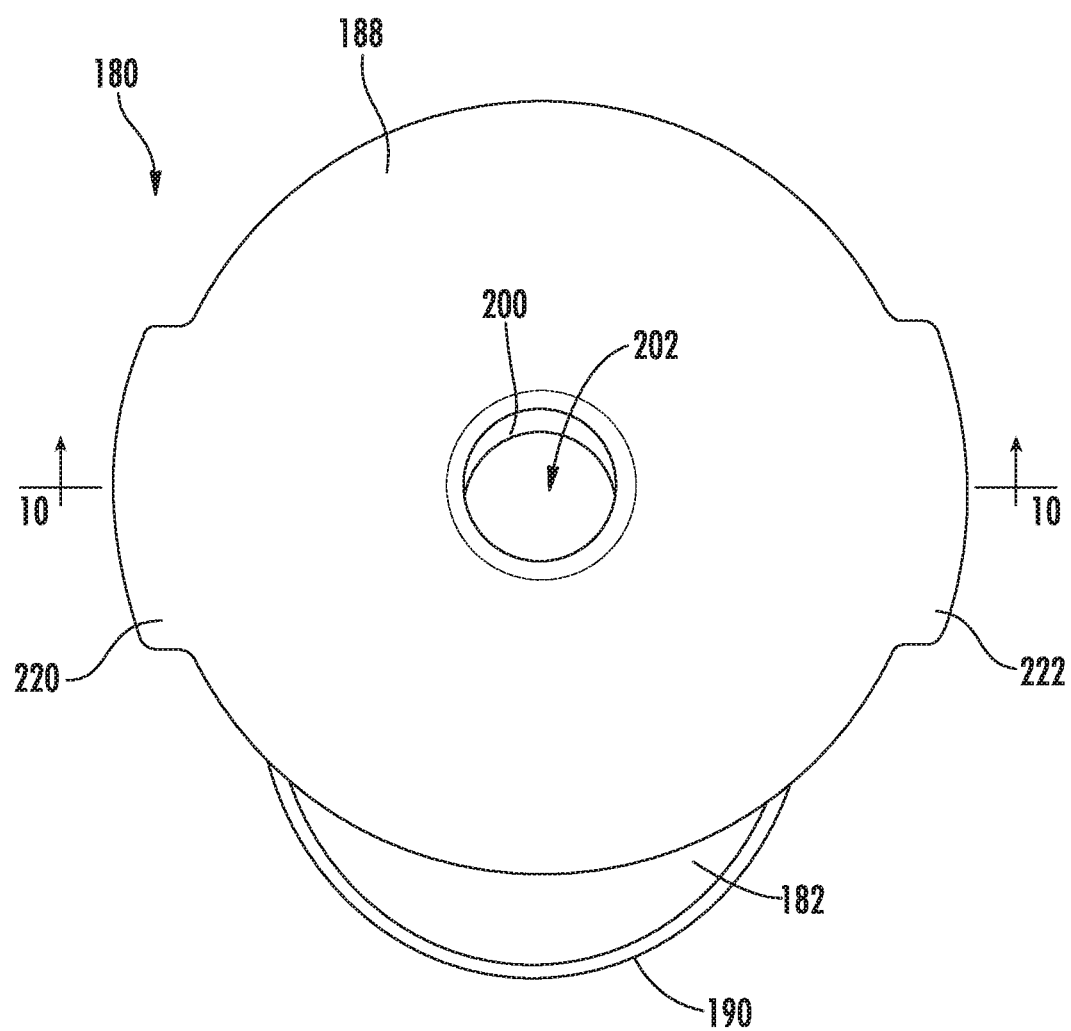
FIG. 8 provides a top-looking-bottom perspective view of a filter media assembly of the filter assembly of FIG. 1.
Figure 9:
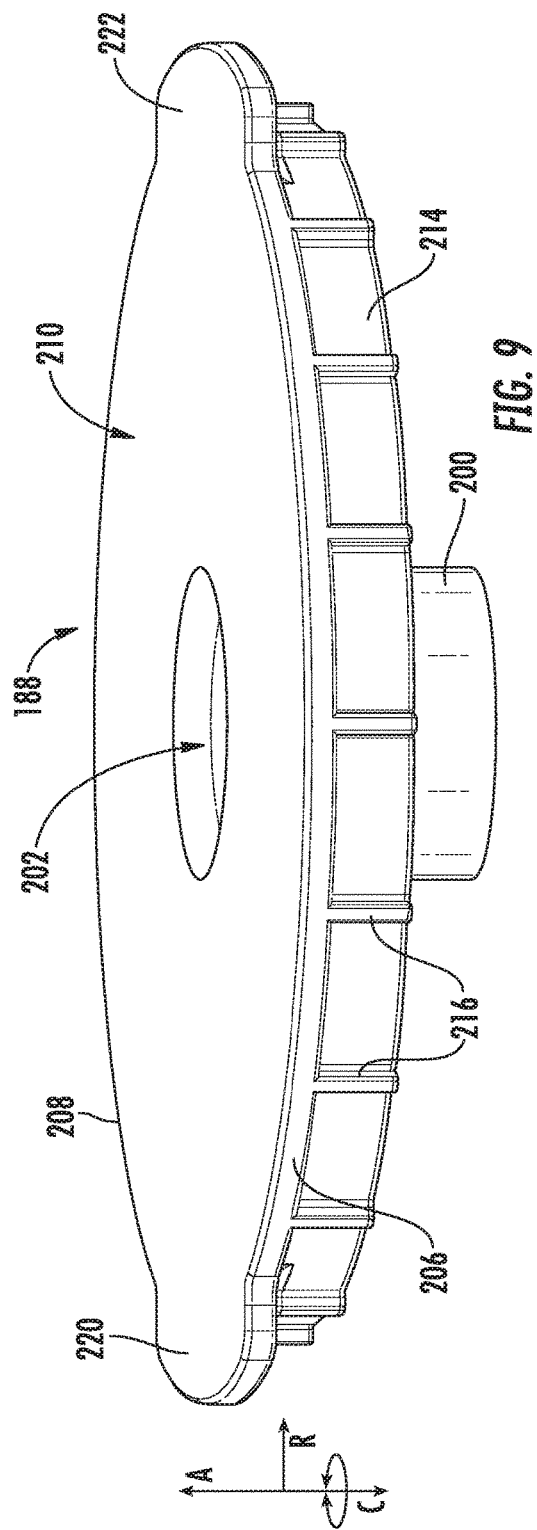
FIG. 9 provides a front, perspective view of a top end cap of the filter media assembly of FIG. 8.
Figure 10:
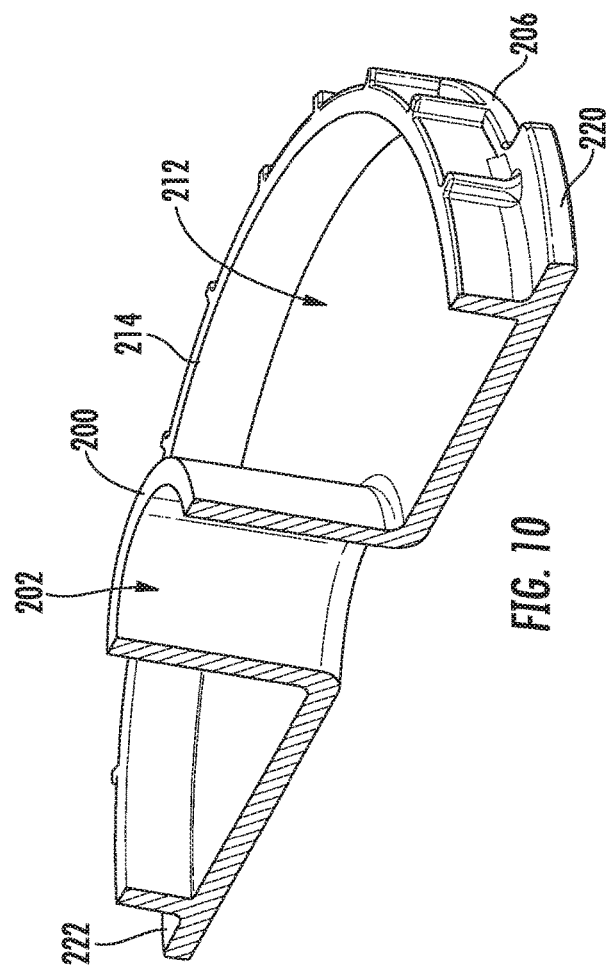
FIG. 10 provides a perspective cross sectional view of the top end cap taken along line 10-10 of FIG. 8.

FIGS. 8, 9, and 10 provide various view of top end cap 188. In particular, FIG. 8 provides a top-looking-bottom perspective view of filter media assembly 180, FIG. 9 provides a front, perspective view of top end cap 188 of Filter media assembly 180, and FIG. 10 provides a perspective cross sectional view of top end cap 188 taken along line 10-10 of FIG. 8. As shown, top end cap 188 includes a body 208 that extends in a plane orthogonal to the axial direction A. Body 208 includes a top surface 210 (FIG. 9) and an opposing bottom surface 212 (FIG. 10). A circumferential flange 214 extends from bottom surface 212 of body 208 about its perimeter. Circumferential flange 214 provides both axial and radial support to filter media 182 when top end cap 188 is attached thereto. Circumferential flange 214 includes a plurality of ribs 216 spaced apart from one another along the circumferential direction C. Ribs 216 may dampen vibrations experienced by filter assembly 100 during operation.

Further, for this exemplary embodiment, top end cap 188 includes one or more lugs. In particular, top end cap 188 includes a first lug 220 that projects outward from body 208 along the radial direction R and extends along the circumferential direction C. In addition, top end cap 188 includes a second lug 222 that projects outward from body 208 along the radial direction R and extends along the circumferential direction C. More particularly, first lug 220 and second lug 222 both project from and extend along an outer edge 206 of body 208, which extends along the perimeter of body 208 along the circumferential direction C. Further, as shown, first lug 220 is spaced from second lug along the circumferential direction C. For this exemplary embodiment, first lug 220 projects from body 208 opposite second lug 222. That is, first lug 220 projects from and extends along body 208 of top end cap 188 about one hundred eighty degrees (180°) from the location where second lug 222 projects from and extends along body 208 of top end cap 188. In this manner, as will be explained further below, during installation or removal of filter media assembly 180 to or from manifold 110, filter media assembly 180 is prevented from tipping or tilting as it is rotated about the axial direction A. Further, for this embodiment, the lugs 220, 222 are evenly distributed along the circumferential direction C. That is, the first and second lugs 220, 222 extend along the circumferential direction C approximately the same distance and are evenly spaced from one another.

Figure 11:
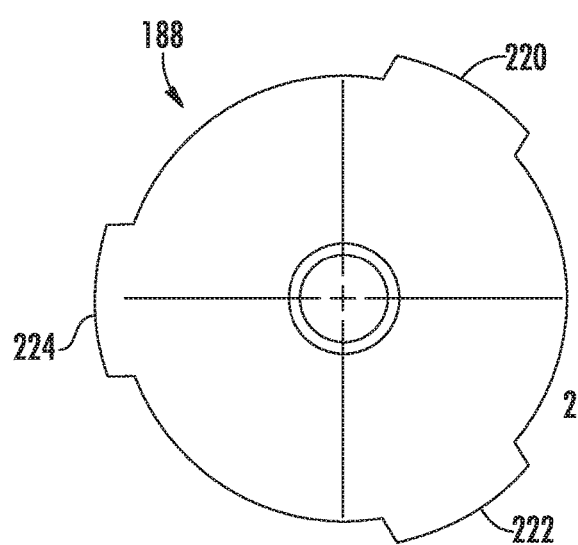
FIGS. 11 through 15 provide top plan views of alternative exemplary embodiments of top end caps that may be incorporated into the filter media assembly of FIG. 8.
Figure 12:
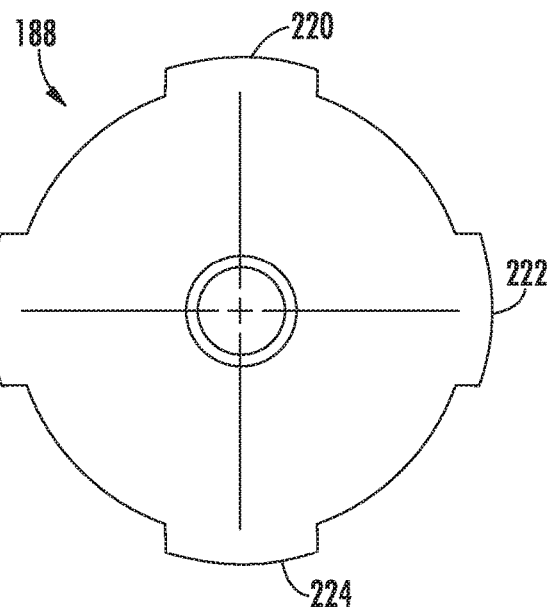

FIGS. 11 through 15 provide top plan views of alternative exemplary embodiments of top end caps that may be incorporated into the filter media assembly of FIG. 8. FIG. 11 provides top end cap 188 having first lug 220, second lug 222, and a third lug 224. For this embodiment, the lugs 220, 222, 224 are evenly distributed along the circumferential direction C. That is, the lugs 220, 222, 224 extend along the circumferential direction C approximately the same distance and are evenly spaced at about one hundred twenty degrees (120°) from one another. FIG. 12 provides top end cap 188 having first lug 220, second lug 222, third lug 224, and a fourth lug 226 evenly distributed along the circumferential direction C.

Figure 13:
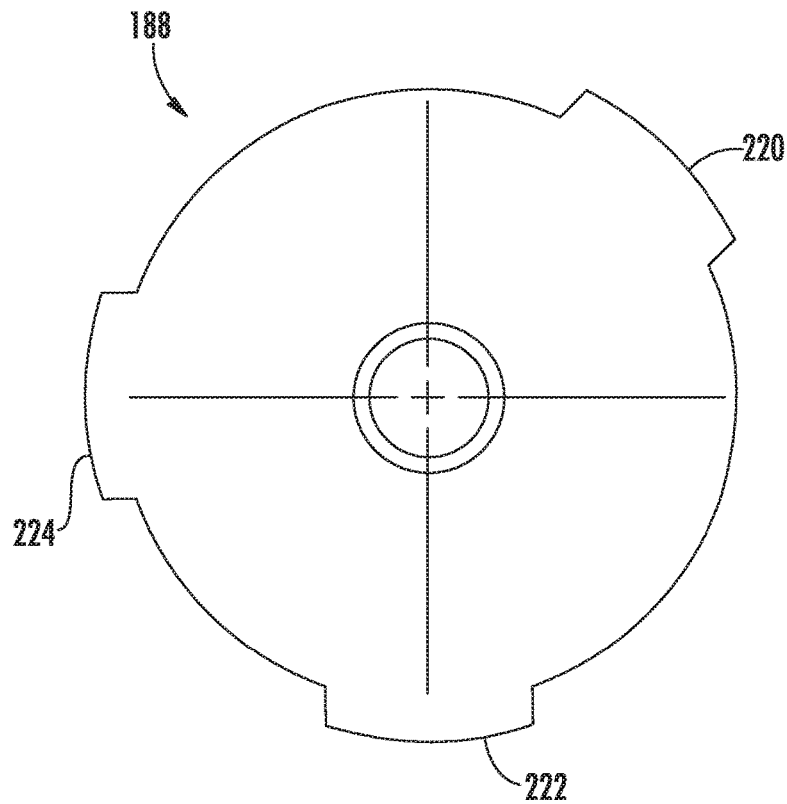

In yet other exemplary embodiments, the one or more lugs of top end cap 188 are unevenly distributed along the circumferential direction C. FIG. 13 provides top end cap 188 having first lug 220, second lug 222, and third lug 224 unevenly distributed about the perimeter of top end cap 188 along the circumferential direction C. As shown, for this embodiment, first lug 220 is spaced from second lug 222 about one hundred thirty-five degrees (135°) and from third lug 226 about one hundred thirty-five degrees (135°). As shown, second lug 222 is spaced from third lug 226 about ninety degrees (90°). Thus, the lugs 220, 222, 226 are unevenly spaced about top end cap 188 about the circumferential direction C. Such an even distribution of the lugs about the circumferential direction C may allow for a keyed interface between the lugs and the guide members of manifold 110.

Figure 14:
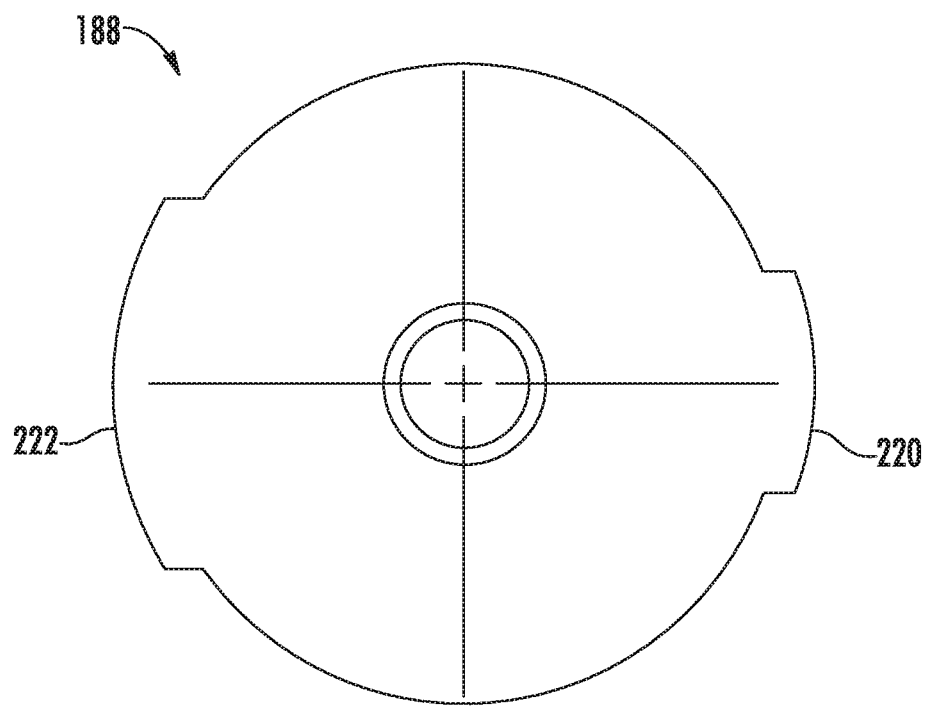
Figure 15:
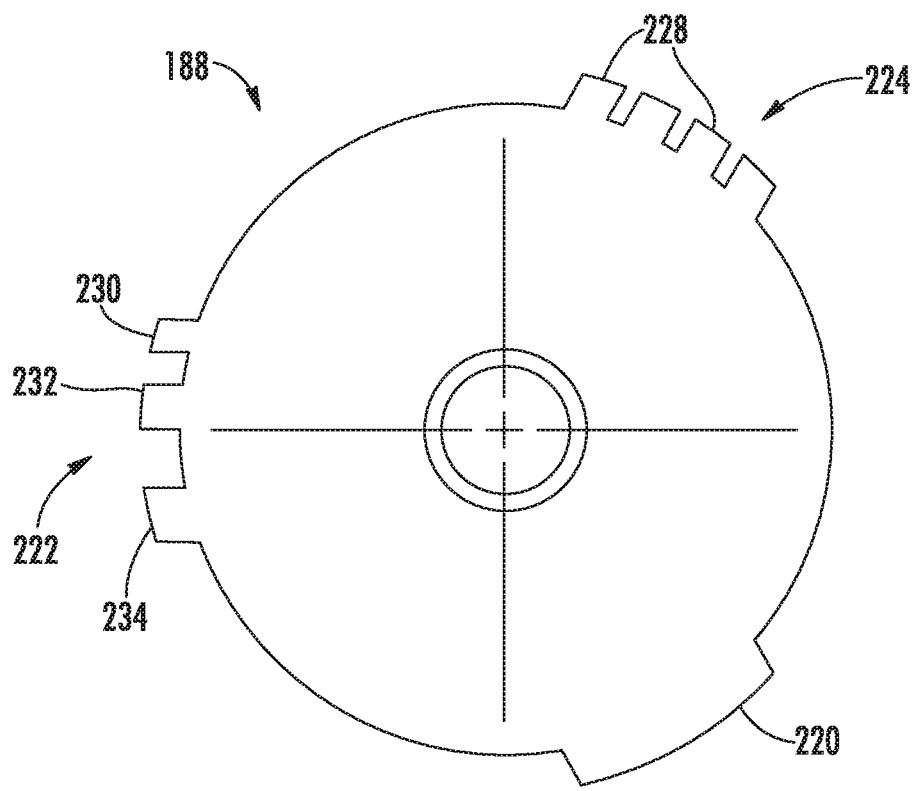

Moreover, in other exemplary embodiments, at least two lugs of top end cap 188 have different geometries. FIG. 14 provides top end cap 188 having lugs with different geometries. As shown, top end cap 188 includes first lug 220 and second lug 224. Second lug 222 extends further along the circumferential direction C than first lug 220. Thus, first lug 220 and second lug 222 have different geometries. As another example, FIG. 15 provides top end cap 188 having first lug 220, second lug 222, and third lug 224. For this embodiment, second lug 222 includes four (4) evenly spaced key projections 228 each having the same width. Further, as shown, third lug 224 includes three (3) key projections that are unevenly spaced and of differing widths. A first key projection 230 is spaced from a second key projection 232 along the circumferential direction C. Second key projection 232 has a wider width than first key projection 232. Third key projection 234 is spaced from second key projection 232 along the circumferential direction C. The space between third key projection 234 and second key projection 232 is wider than the space defined between first key projection 230 and second key projection 232. Moreover, third key projection 234 has a wider width than second key projection 232. Manifold 110, and more particularly guide members 144, 146, may include recessed key slots in which the key projections may be fit into when filter media assembly 180 is secured to manifold 110. As another example, one lug may have a circumferential cross section as shown in FIG. 10 and one lug may have a circumferential cross section that includes a groove defined in the lug or an extension portion that extends further out along the radial direction than the remaining portion of the lug. Other geometries are also possible. Top end caps 188 having lugs with differing geometries may allow for a keyed interface between the lugs and the guide members of manifold 110.

Figure 16:
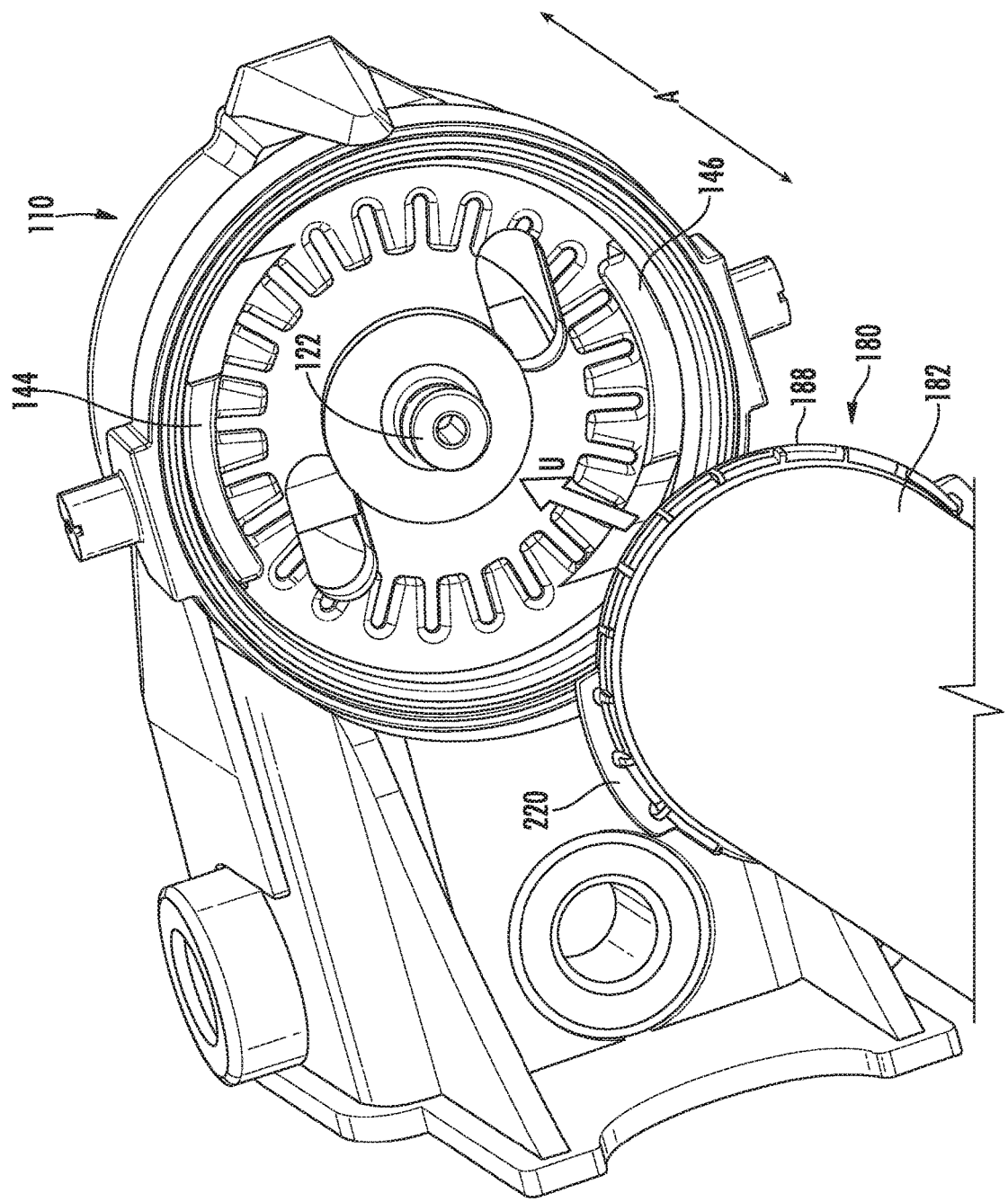
FIG. 16 provides a bottom-looking-top perspective view of the filter media assembly of FIG. 8 positioned for mounting with the manifold.
Figure 17:
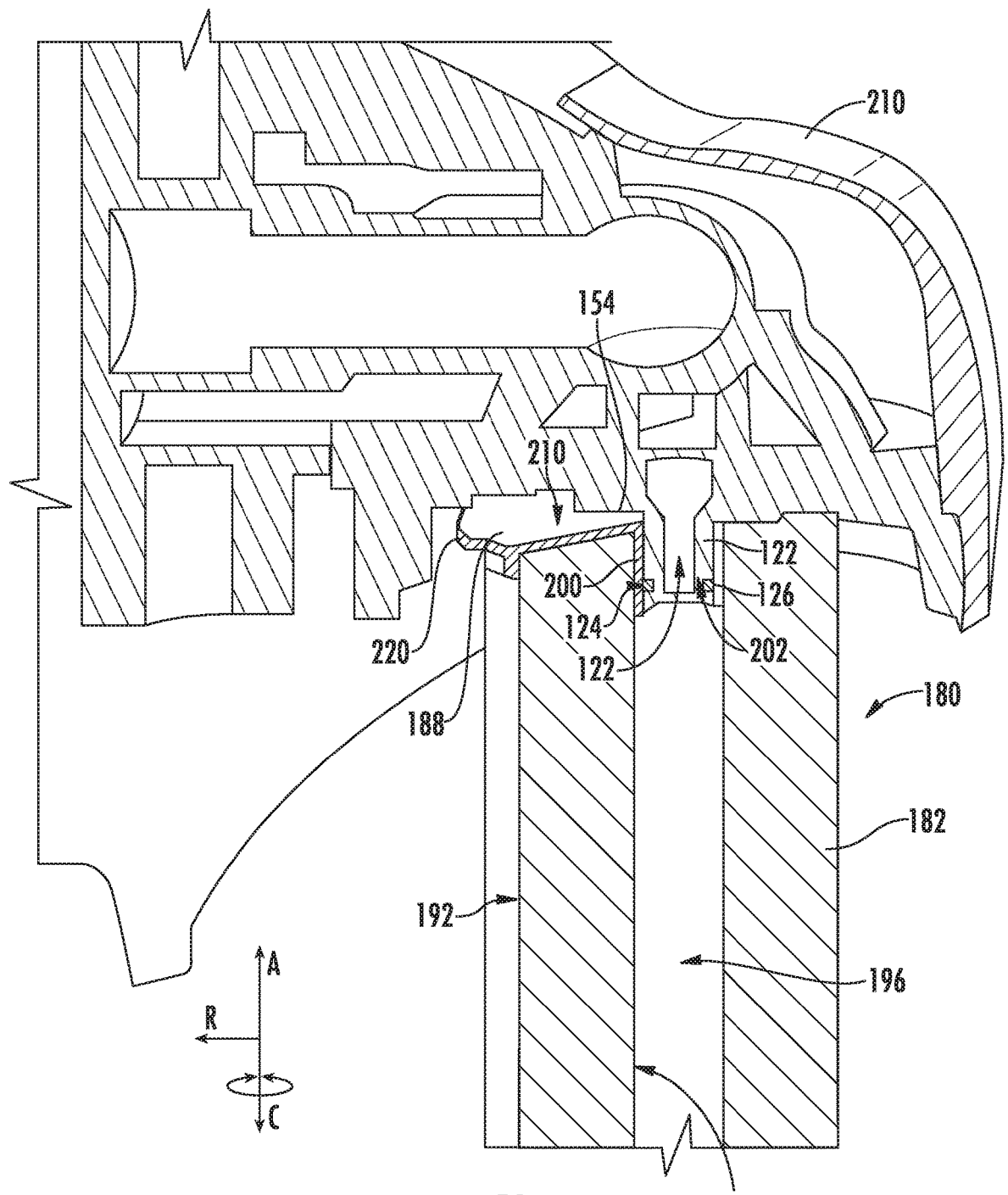
FIG. 17 provides a perspective cross-sectional view of the filter media assembly of FIG. 8 mounted to the manifold.

FIGS. 16 through 19 provide various views of one exemplary manner in which filter media assembly 180 may be mounted to manifold 110. FIG. 16 provides a bottom-looking-top perspective view of filter media assembly 180 positioned for mounting with manifold 110. More particularly, as shown, filter media assembly 180 is positioned so that cap outlet port 200 of top end cap 188 (see FIG. 17) is aligned with manifold outlet port 122 of manifold 110. To mount Filter media assembly 180 with manifold 110, filter media assembly 180 is moved upward along the axial direction A, as denoted by arrow U. As filter media assembly 180 is moved upward along the axial direction A, manifold outlet port 122 is received within cap outlet port 200. For instance, FIG. 17 provides a perspective cross-sectional view of filter media assembly 180 mounted to manifold 110 and depicts manifold outlet port 122 received within opening 202 defined by cap outlet port 200 (see also FIGS. 3 and 4). The upward movement of filter media assembly 180 is stopped or halted when top surface 210 of top end cap 188 is seated against outlet port flange 154 of manifold 110, e.g., as shown particularly in FIGS. 4 and 17. Moreover, when manifold outlet port 122 is received within opening 202 of cap outlet port 200, sealing element 126 positioned within groove 124 of manifold outlet port 122 creates a radial seal between manifold 110 and filter media assembly 180, or more particularly, between manifold outlet port 122 and top end cap 188. Radial seal, as noted above, prevents fluid flowing through inlet passages 118 to bypass filter media 182 of filter media assembly 180 and contaminate the filtered water within filtered volume 196.

Figure 18:
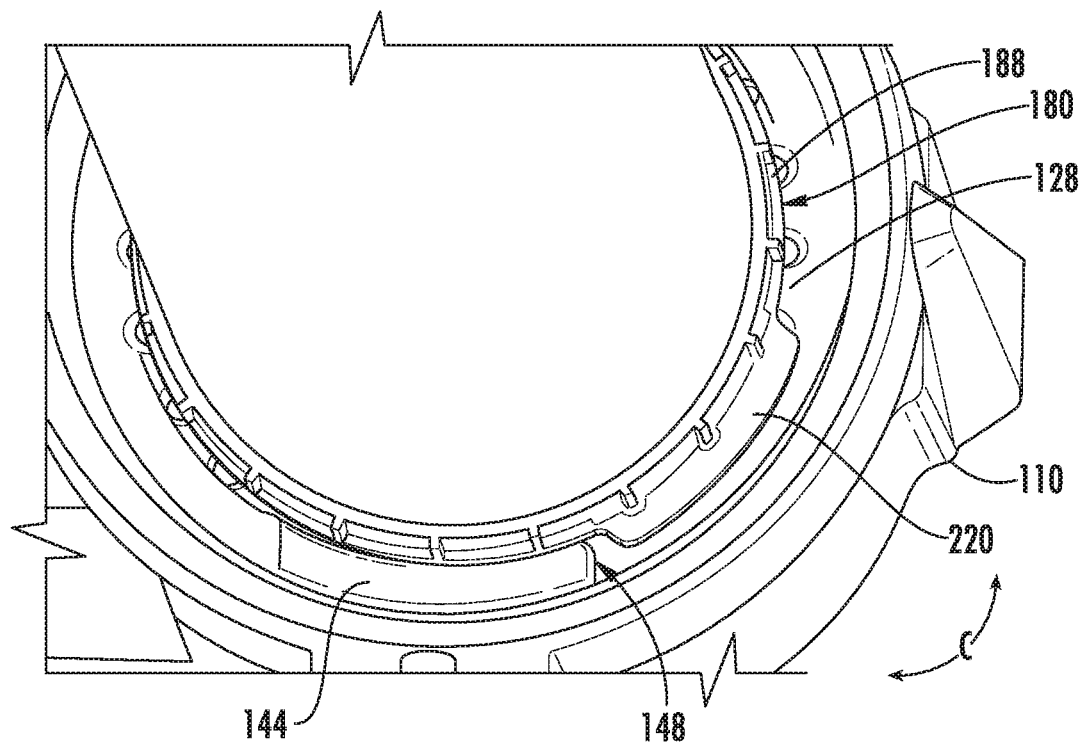
FIG. 18 provides close up, bottom-looking-top perspective view of the filter media assembly of FIG. 8 being secured to the manifold.
Figure 19:
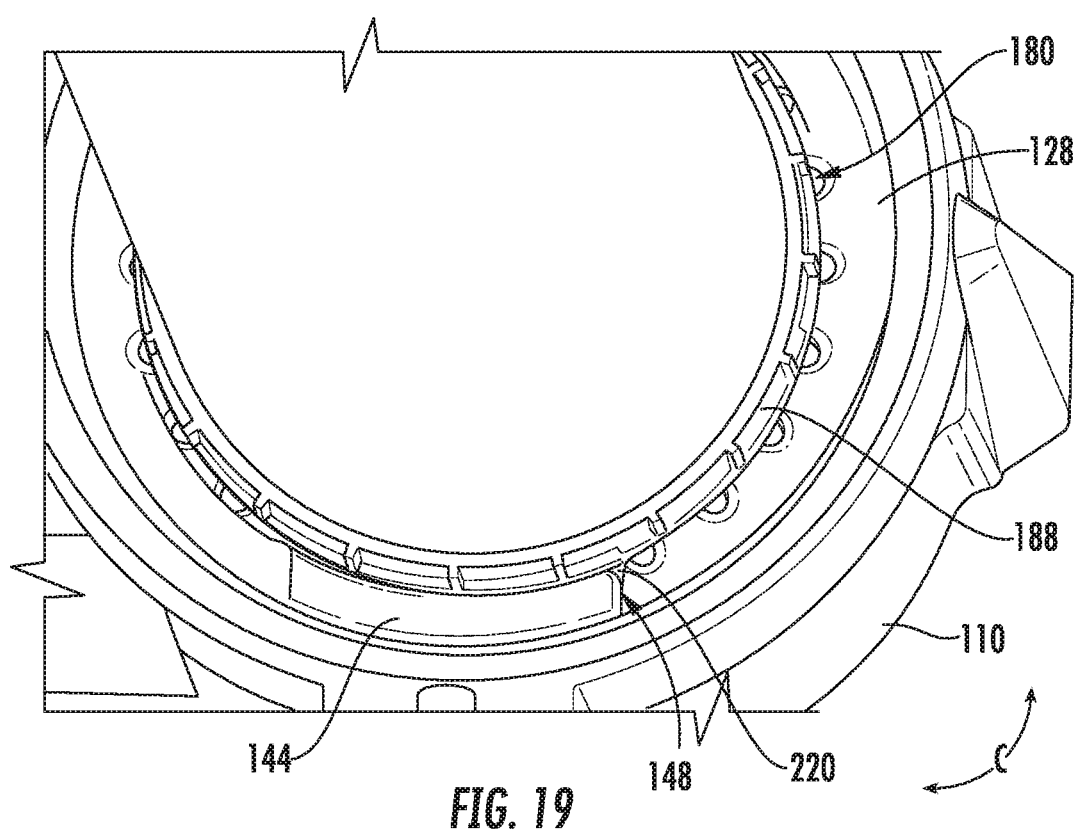
FIG. 19 provides close up, bottom-looking-top perspective view of the filter media assembly of FIG. 8 secured to the manifold.

FIGS. 18 and 19 provide close up, bottom-looking-top perspective views of filter media assembly 180 being secured to manifold 110. As shown in FIGS. 17 and 18, once manifold outlet port 122 is received within opening 202 of cap outlet port 200 of the top end cap 188 and top end cap 188 is seated or pushed flush against outlet port flange 154, filter media assembly 180 is rotated about the circumferential direction C. As filter media assembly 180 is rotated, first lug 220 of top end cap 188 is received within undercut groove 148 of first guide member 144 and second lug 222 of top end cap 188 is received within undercut groove 150 of second guide member 146. In FIG. 18, first lug 220 is shown being rotated along the circumferential direction C toward undercut groove 148 of first guide member 144. In FIG. 19, first lug 220 is shown positioned or received within undercut groove 148 of first guide member 144. FIG. 4 provides another view of first lug 220 positioned within undercut groove 148 of first guide member 144. Although not shown, as filter media assembly 180 is rotated, second lug 222 is likewise positioned or received within undercut groove 150 of second guide member 146. For this embodiment, undercut groove 148 of first guide member 144 is sized to receive the entire circumferential length of first lug 220 of top end cap 188, and although not shown, undercut groove 150 of second guide member 146 is sized to receive the entire circumferential length of second lug 222 of top end cap 188. Further, as first and second lugs 220, 222 may be inserted into and removed from their respective undercut grooves 148, 150 of first and second guide members 144, 146, first lug 220 is removably insertable into undercut groove 148 of first guide member 144 and second lug 222 is removably insertable into undercut groove 150 of second guide member 146.

Aside from a visual inspection of the lugs relative to the guides, an operator may know that filter media assembly 180 is fully rotated into position when first lug 220 contacts or presses against a groove stop 149 of first guide member 144 (see FIG. 6) and second lug 222 contacts or presses against a groove stop 151 of second guide member 146 (FIG. 7). Further, in embodiments where first lug 220 and second lug 222 project from body 208 of top end cap 188 opposite one another and first guide member 144 and second guide member 146 project from recessed wall 128 of manifold 110 opposite one another, first and second lugs 220, 222 are positioned or received within undercut grooves 148, 150 of first and second guide members 144, 146, respectively. In this way, filter media assembly 180 is prevented from tipping or tilting while being secured to manifold 110.

After securing filter media assembly 180 with manifold 110, sump 160 may then be mounted to manifold 110. For instance, as shown in FIG. 3, sump 160 is mounted to manifold 110 by a threaded engagement between threads 117 of manifold 110 and threads 170 of sump 160. After sump 160 is mounted to manifold 110, filter assembly 100 may be suitable for use.

The interfaces between first lug 220 and first guide member 144 and second lug 222 and second guide member 146 secures filter media assembly 180 with manifold 110. Notably, for this exemplary embodiment, filter media assembly 180 is secured directly to manifold 110. Thus, filter media assembly 180 may be aligned and sealed with manifold 110 prior to sump 160 being attached or mounted to manifold 110. In this way, among other benefits, the installation process may be simplified. Further, as filter media assembly 180 is sealed with manifold 110 when it is mounted thereto, exemplary filter assembly 100 does not rely on sump 160 to create a compression seal between manifold 110 and filter media assembly 180 during mounting of sump 160 with manifold 110.

To remove filter media assembly 180 from filter assembly 100, e.g., when filter media 182 has lost effectiveness, the process noted above for installation of filter media assembly 180 with manifold 110 may be employed but in the reverse. That is, sump 160 is removed from manifold 110. For instance, sump 160 may be rotated about the circumferential direction C such that threads 170 of sump 160 disengaged from threads 117 of manifold 110. Sump 160 may be filled with water after being used in operation to filter water. Accordingly, as sump 160 is moved downward along the axial direction A (i.e., a direction opposite the upward direction), it is beneficial to steadily lower sump 160 without tilting or tipping sump 160, e.g., to prevent water spillage. As filter media assembly 180 remains attached or mounted to manifold 110 while sump 160 is removed or lowered, the water within internal chamber 162 of sump 160 is lowered away from top portion 164 of sump 160 (i.e., the water level drops within sump 160) as the volume of filter media assembly 180 within internal chamber 162 decreases as sump 160 is lowered away from manifold 110. This reduces the probability of water spillage from sump 160 during removal.

Sump 160 is removed from manifold 110, filter media assembly 180 may be removed. To remove filter media assembly 180 from manifold 110, filter media assembly 180 is rotated about the circumferential direction C such that first lug 220 is removed from undercut groove 148 of first guide member 144 and second lug 222 is removed from undercut groove 150 of second guide member 146. Thereafter, an operator may lower or move filter media assembly 180 downward along the axial direction A to disengage manifold outlet port 122 from cap outlet port 200, and consequently, filter media assembly 180 is disengaged from manifold 110. After removing filter media assembly 180 from manifold 110, a new filter media assembly 180 may be installed as outlined above.

Further, in some instances, it may be desirable to inspect filter media 182 of filter media assembly 180, e.g., to check its condition or to predict its remaining useful service life. To inspect filter media 182 of filter media assembly 180, an operator may remove sump 160 from manifold 110 in a manner described above. As filter media assembly 180 remains attached or mounted to manifold 110 even when sump 160 is removed from manifold 110, an operator may more easily inspect filter media 182 as it remains in place and hangs or is suspended by manifold 110, thereby facilitating inspection.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter assembly defining an axial direction, a radial direction, and a circumferential direction, the filter assembly comprising:
   a manifold having an inlet for liquid flow into the filter assembly and an outlet for liquid flow out of the filter assembly, the manifold comprising one or more guide members each defining an undercut groove;
   a sump defining an internal chamber and removably mounted with the manifold; and
   a filter media assembly receivable within the internal chamber of the sump and separately comprising a filter media and an end cap attached thereto, the end cap comprising a body having a top surface and one or more lugs projecting outward from an outer edge of the body along the radial direction and extend along the circumferential direction, the one or more lugs not extending above the top surface along the axial direction, the one or more lugs being removably insertable into a respective one of the undercut grooves of one of the guide members.

2. The filter assembly of claim 1, wherein the filter media assembly is directly removably mounted with the manifold.

3. The filter assembly of claim 1, wherein the filter media defines a filtered volume and the manifold defines an outlet passage, the outlet passage providing fluid communication between the filtered volume and the outlet of the manifold, and wherein the outlet passage is the only passage providing fluid communication between the filtered volume and the outlet of the manifold.

4. The filter assembly of claim 1, wherein the filter media defines a filtered volume, and wherein the end cap comprises a cap outlet port extending into the filtered volume, the cap outlet port defining an opening, and wherein the manifold comprises a manifold outlet port received within the opening of the cap outlet port, the manifold outlet port defining a groove, and wherein the filter assembly further comprises:
   a sealing element positioned within the groove between the manifold outlet port and the cap outlet port to seal the filter media assembly with the manifold.

5. The filter assembly of claim 1, wherein the manifold comprises a recessed wall within a cavity defined by the manifold, wherein the one or more guide members project from the recessed wall of the manifold.

6. The filter assembly of claim 5, wherein the one or more guide members project outward from the recessed wall along the axial direction and extend along the circumferential direction.

7. The filter assembly of claim 1, wherein the one or more guide members comprise a groove stop.

8. The filter assembly of claim 1, wherein the manifold defines a cavity, and wherein the manifold further comprises an attachment plate seated within the cavity, the attachment plate having a recessed wall, and wherein the one or more guide members extend from the recessed wall of the attachment plate and are spaced from one another along the circumferential direction.

9. The filter assembly of claim 1, wherein the one or more lugs are evenly distributed along the circumferential direction.

10. The filter assembly of claim 1, wherein the filter media defines a filtered volume in liquid communication with a single outlet passage defined by the manifold, wherein the manifold defines one or more inlet passages that provide liquid communication between the inlet of the manifold and the filter media, and wherein the filter media has an outer surface, the outer surface defining a filter media inlet through which unfiltered liquid flows to the filter volume.

11. A filter assembly defining an axial direction, a radial direction, and a circumferential direction, the filter assembly comprising:
   a manifold having an inlet for liquid flow into the filter assembly and an outlet for liquid flow out of the filter assembly, the manifold comprising:
      a recessed wall disposed within a cavity defined by the manifold; and
      one or more guide members projecting from the recessed wall along the axial direction and extending along the circumferential direction, each of the one or more guide members defining an undercut groove;
   a sump defining an internal chamber and removably mounted with the manifold; and
   a filter media assembly receivable within the internal chamber of the sump and separately comprising a filter media and an end cap attached thereto, the end cap comprising a body having a top surface and one or more lugs projecting outward from an outer edge of the body along the radial direction and extending along the circumferential direction, the one or more lugs not extending above the top surface along the axial direction, and wherein the one or more lugs are removably insertable into a respective one of the undercut grooves of one of the guide members such that the filter media assembly is removably mounted with the manifold separately from the sump.

12. The filter assembly of claim 11, wherein the filter media assembly is directly removably mounted with the manifold and the sump is directly removably mounted with the manifold.

13. The filter assembly of claim 11, wherein one of the undercut grooves of one of the guide members is sized to receive the entire circumferential length of one of the one or more lugs of the end cap.

14. The filter assembly of claim 11, wherein one of the one or more guide members comprises a groove stop.

15. The filter assembly of claim 11, wherein the one or more guide members include a first guide member and a second guide member, and wherein the one of more lugs comprise a first lug and a second lug, and wherein the first lug projects outward from the body along the radial direction and extends along the circumferential direction opposite the second lug and wherein the first guide member projects outward from the recessed wall along the axial direction and extends along the circumferential direction opposite the second guide member.

16. The filter assembly of claim 11, wherein the filter media defines a filtered volume extending along the axial direction, and wherein the end cap comprises a cap outlet port extending into the filtered volume along the axial direction, the cap outlet port defining an opening, and wherein the manifold comprises a manifold outlet port extending into the filtered volume and received within the opening of the cap outlet port, the manifold outlet port defining a groove extending about the manifold outlet port along the circumferential direction, and wherein the filter assembly further comprises:
   a sealing element positioned within the groove between the manifold outlet port and the cap outlet port to seal the filter media assembly with the manifold along the radial direction.

17. The filter assembly of claim 11, wherein the recessed wall of the manifold has a perimeter, and wherein the one or more guide members project from and extend along the perimeter of the recessed wall along the axial direction and circumferential direction, respectively.

18. The filter assembly of claim 1, wherein the filter media assembly is directly removably mounted with the manifold separately from the sump.

19. The filter assembly of claim 1, wherein the sump is removably mounted with the manifold by a threaded engagement between threads of the manifold and threads of the sump.

* * * * *